(12) United States Patent
Swar et al.

(10) Patent No.: US 12,323,890 B2
(45) Date of Patent: Jun. 3, 2025

(54) VEHICLE COMMUNICATION VIA MULTIPLE WIRELESS COMMUNICATION LINKS

(71) Applicant: Westinghouse Air Brake Technologies Corporation, Pittsburgh, PA (US)

(72) Inventors: Padam Dhoj Swar, Clarksburg, MD (US); Carl L. Haas, Walkersville, MD (US); Danial Rice, Frederick, MD (US)

(73) Assignee: Westinghouse Air Brake Technologies Corporation, Pittsburgh, PA (US)

( * ) Notice: Subject to any disclaimer, the term of this patent is extended or adjusted under 35 U.S.C. 154(b) by 0 days.

(21) Appl. No.: 18/543,645

(22) Filed: Dec. 18, 2023

(65) Prior Publication Data

US 2024/0121584 A1   Apr. 11, 2024

Related U.S. Application Data (63) Continuation of application No. 17/408,124, filed on Aug. 20, 2021, now Pat. No. 11,889,395, which is a continuation-in-part of application No. 16/235,144, filed on Dec. 28, 2018, now Pat. No. 11,129,220.

(51) Int. Cl.
*H04W 4/46* (2018.01)
*H04W 76/15* (2018.01)
*H04W 76/30* (2018.01)

(52) U.S. Cl.
CPC ............ *H04W 4/46* (2018.02); *H04W 76/15* (2018.02); *H04W 76/30* (2018.02)

(58) Field of Classification Search
CPC ....... H04W 4/46; H04W 76/15; H04W 76/30; H04W 4/42; H04W 84/005; H04W 12/10; H04W 52/0229; H04W 52/028; Y02D 30/70; H04B 1/40; H04B 1/0483
USPC ...................................................... 455/422.1
See application file for complete search history.

(56) References Cited

U.S. PATENT DOCUMENTS

| | | | |
|---|---|---|---|
| 6,862,502 B2 | 3/2005 | Peltz et al. |
| 7,715,956 B2 | 5/2010 | Bryant |
| 8,073,582 B2 | 12/2011 | Kellner et al. |
| 8,825,239 B2 | 9/2014 | Cooper et al. |
| 9,637,147 B2 | 5/2017 | Golden et al. |
| 10,065,665 B2 | 9/2018 | Cooper et al. |

(Continued)

OTHER PUBLICATIONS

Office Action mailed Dec. 9, 2022 for corresponding Mexican Application No. MX/A/2019/012925, English translation provided (6 pages).

*Primary Examiner* — Eugene Yun
(74) *Attorney, Agent, or Firm* — K&L Gates LLP (57) ABSTRACT

A method of communication between first and second controllers positioned in spaced relation along a length of a vehicle system includes establishing first and second wireless, parallel communication channels between the first and second controllers. The channels operate at different carrier frequencies. The first controller transmits common information in parallel on the first and second wireless communication channels to the second controller, and the second controller receives the information transmitted in parallel on first and second wireless communication channels. The first and second wireless communication channels are then deactivated Subsequently, a single communication channel is established for communicating other, different information between the controllers.

20 Claims, 6 Drawing Sheets

(56) References Cited

U.S. PATENT DOCUMENTS

| | | |
|---|---|---|
| 11,129,220 B2 | 9/2021 | Swar et al. |
| 11,889,395 B2 * | 1/2024 | Swar ................... H04W 52/028 |
| 2010/0130124 A1 | 5/2010 | Teeter et al. |
| 2012/0123617 A1 | 5/2012 | Noffsinger et al. |
| 2012/0142397 A1 | 6/2012 | Jordan et al. |
| 2013/0095883 A1 | 4/2013 | Hirsch et al. |
| 2013/0151032 A1 | 6/2013 | Kraeling et al. |
| 2014/0086209 A1 | 3/2014 | Su et al. |
| 2015/0045993 A1 | 2/2015 | Cooper et al. |
| 2016/0194014 A1 | 7/2016 | Rajendran |

* cited by examiner

FIG. 5

VEHICLE COMMUNICATION VIA MULTIPLE WIRELESS COMMUNICATION LINKS

CROSS-REFERENCE TO RELATED APPLICATIONS

This application is a continuation of U.S. patent application Ser. No. 17/408,124 (filed 20 Aug. 2021), which is a continuation-in-part of U.S. patent application Ser. No. 16/235,144 (filed 28 Dec. 2018, now U.S. Pat. No. 11,129,220), the entire disclosures of which are incorporated herein by reference.

BACKGROUND

Technical Field

The subject matter described herein relates to communications between devices of a vehicle system.

Description of Related Art

Some vehicle devices utilize single wireless communication channels or links. For example, some existing head of train (HOT) and end of train (EOT) devices onboard rail vehicle systems utilize a single wireless communication channel or link and, therefore, do not have redundancy when the vehicle systems pass through a challenging radio frequency (RF) environment. Current practices and regulations allow for long periods of time without communication between the HOT and EOT, e.g., up to approximately 16.5 minutes. This can be potentially an unsafe situation, especially where emergency braking is needed when there is no communication.

BRIEF DESCRIPTION

Generally, provided, in some non-limiting embodiments or examples is a method of communicating between first and second controllers e.g., an HOT and an EOT, of a rail vehicle system, e.g., train.

In an embodiment, a method of communication between a first wireless transceiver (e.g., an HOT device) positioned at or proximate a front of a vehicle system (e.g., train) and a second wireless transceiver (e.g., an EOT device) positioned at or proximate a rear of the vehicle system is provided. The method can include providing, between, for example, the HOT and the EOT, a plurality of wireless communication channels, with each of the wireless communication channels operating at a different radio carrier frequency than each other of the wireless communication channels. The method also can include causing the plural wireless communication channels to be active and in communication in parallel and subsequently communicating, by one of the HOT or EOT, information in parallel on the plural wireless communication channels, subsequently receiving, by the other of the HOT or EOT, the information transmitted in parallel on the plural wireless communication channels, and subsequently causing the plural wireless communication channels to be inactive and out of communication.

The method can repeat one or more of these operations (e.g., intermittently).

Causing the channels to be inactive and out of communication can include determining, by the other of the HOT or EOT, data integrity of the information transmitted on each wireless communication channel. In response to the determining that that the data integrity for the plurality of wireless communication channels is the same, the other of the HOT or EOT can store or respond to the information. Determining the data integrity can include determining a checksum, a Bose-Chaudhuri-Hocquenghem (BCH) code, and/or a cyclic redundancy check (CRC). The information that is communicated can include digital data that is modulated on each radio carrier frequency.

Another method of communication between an HOT device positioned at or proximate a first end of a train and an EOT device positioned at or proximate a second end of a train is provided. The method can include providing, between the HOT and the EOT, first and second wireless communication channels. The first wireless communication channel can operate at a first frequency band and the second wireless communication channel operating at a second, different frequency band. The method also can include causing the first and second wireless communication channels to be in communication in parallel, where the HOT and EOT are in communication via both the first and second wireless communication channels. The method can include causing, by one of the HOT or EOT, information to be transmitted in parallel on the first and second wireless communication channels, receiving, by the other of the HOT or EOT, the information transmitted in parallel on first and second wireless communication channels, and causing the first and second wireless communication channels to be inactive, where the HOT and EOT are out of communication with each other.

The HOT can include at least one HOT radio transceiver, the EOT can include at least one EOT radio transceiver, and the at least one HOT radio transceiver and the at least one EOT radio transceiver can enter into a low power, stand-by or sleep mode, where the first and second wireless communication channels are inactive. The method also can include one of the EOT and HOT radio transceivers awakening from the low power, stand-by or sleep mode into an active, fully operational mode, and initiating communication with the other of the EOT and HOT radio transceivers via at least one of the first and second wireless communication channels, where the other of the EOT and HOT radio transceivers awakes from a low power, stand-by or sleep mode into an active, fully operational mode, where the EOT and HOT radio transceivers form the first and second wireless communication channels. The low power, stand-by, or sleep mode can include the transceiver remaining on and receiving at least some electric current to remain powered, but with the transceiver not receiving enough current to wirelessly transmit a signal. The active, fully operational mode can include the transceiver remaining on and receiving enough current to wirelessly transmit a signal. Alternatively, the low power, stand-by, or sleep mode can include the transceiver being deactivated or turned off such that the transceiver is not receiving any current. The method also can repeat one or more of the operations (e.g., intermittently or otherwise).

The method can include determining a first checksum of the information transmitted on the first wireless communication channel and a second checksum of the information transmitted on the second wireless communication channel and, in response to determining that the first and second checksums are the same, storing or responding to the information. The method also can include determining a first checksum of the information transmitted on the first wireless communication channel and a second checksum of the information transmitted on the second wireless communication channel. In response to determining the first checksum is not equal to a reference checksum included in the information transmitted on at least one the first and second wireless communication channels and the second checksum is equal to the reference checksum, the method can include storing or responding only to the information transmitted on the second wireless communication channel.

Responding to the information can include the other of the HOT or EOT communicating second information in parallel on the first and second wireless communication channels, and the one of the HOT or EOT receiving the second information transmitted in parallel on the first and second wireless communication channels. The information can include digital data that is modulated on each frequency band.

Each frequency band can include a frequency of 450 MHz, between 450 MHz and 500 MHz, 220 MHz, 160 MHz. or a cellular telephone frequency between 700 MHz and 2.7 GHz. The frequency may be a center frequency of the frequency band.

Another method of communication between first and second controllers onboard a vehicle system is provided. Each controller may include one or more processors. The method can include forming first and second wireless communication channels between the first and second controllers. The first wireless communication channel can operate at a first frequency and the second wireless communication channel can operate at a second, different frequency. The method also can include causing the first and second wireless communication channels to be in communication in parallel via both the first and second wireless communication channels. The method can include the first controller causing information to be transmitted in parallel on the first and second wireless communication channels to the second controller and the second controller receiving the information transmitted in parallel on first and second wireless communication channels. The method also can include causing the first and second wireless communication channels to be inactive, whereupon the first and second controllers are out of communication (e.g., unable to communicate with each other).

The first controller can include at least one first radio transceiver and the second controller can include at least one second radio transceiver. The method also can include the first radio transceiver and/or the second radio transceiver entering into a low power, stand-by, or sleep mode, whereupon the first and second wireless communication channels are inactive. The method also can include one of the first and second radio transceivers awakening from the low power, stand-by or sleep mode into an active, fully operational mode and initiating communication with the other of the first and second radio transceivers via at least one of the first and second wireless communication channels, whereupon the other of the first and second radio transceivers awakes from a low power, stand-by or sleep mode into its active, fully operational mode. The first and second radio transceivers can then form the first and second wireless communication channels.

The first controller can be one of an HOT device positioned at or proximate a first end of a vehicle system or an EOT device positioned at or proximate a second end of the vehicle system. The second controller can be the other of the HOT and EOT.

DETAILED DESCRIPTION

Various non-limiting examples will now be described with reference to the accompanying figures where like reference numbers correspond to like or functionally equivalent elements.

For purposes of the description hereinafter, the terms "end," "upper," "lower," "right," "left," "vertical," "horizontal," "top," "bottom," "lateral," "longitudinal," and derivatives thereof shall relate to the example(s) as oriented in the drawing figures. However, it is to be understood that the example(s) may assume various alternative variations and step sequences, except where expressly specified to the contrary. It is also to be understood that the specific example (s) illustrated in the attached drawings, and described in the following specification, are simply exemplary examples or aspects of the invention. Hence, the specific examples or aspects disclosed herein are not to be construed as limiting.

Figure 1:
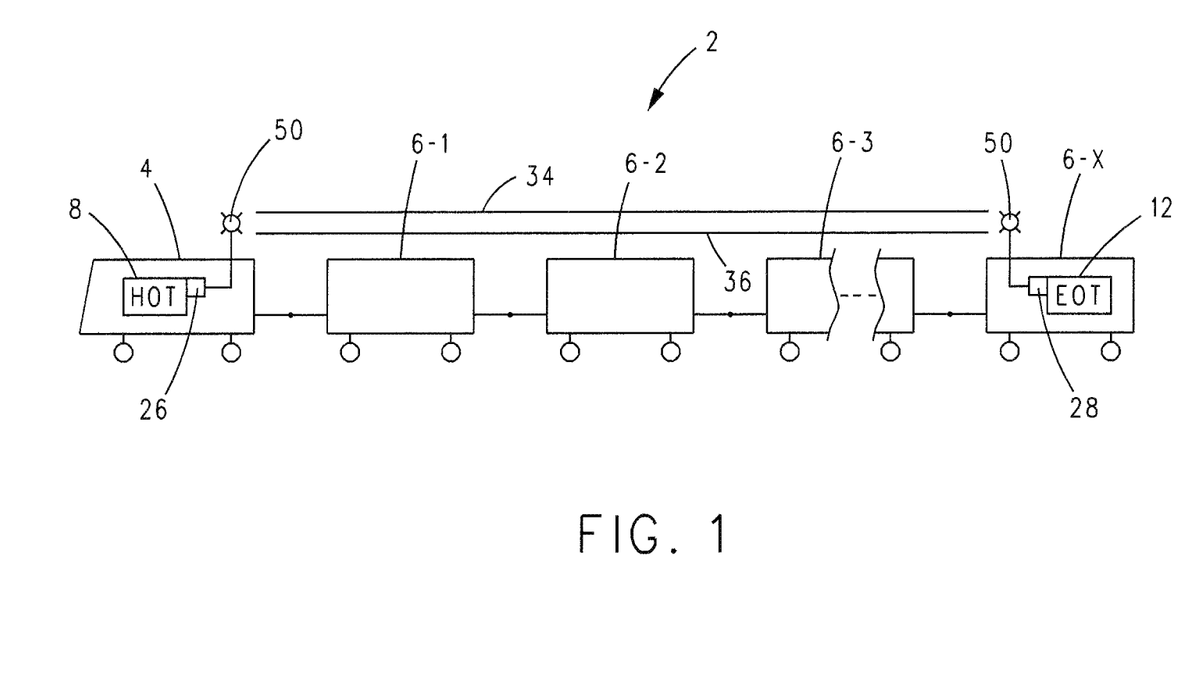
FIG. 1 is a schematic side-view of a vehicle system including a propulsion-generating vehicle and a number of non-propulsion-generating vehicles.

With reference to FIG. 1, in some embodiments or examples, a vehicle system 2 can include a propulsion-generating vehicle 4 and a number of non-propulsion-generating vehicles 6-1-6-X, where "X" can be any whole number greater than or equal to 2. The vehicle system can be a rail vehicle system where the vehicle 4 represents a locomotive and the vehicles 6 represent rail cars. Alternatively, the vehicle system may include a single vehicle 6 and/or more than one vehicle 4. Optionally, the vehicle system may be formed from non-rail vehicles, such as automobiles, trucks, mining vehicles, marine vessels, barges, trailers, agricultural vehicles, or the like. In the example vehicle system 2 shown in FIG. 1, the vehicle 4 is the lead vehicle of the vehicle system and the vehicle 6-X is the last vehicle of vehicle system 2. Optionally, the lead vehicle can be a vehicle 6 other than the vehicle 4 (e.g., the vehicle 4 can be positioned in the vehicle system 2 between the lead vehicle and the last vehicle). For the purposes of the following description, the vehicle 4 will be the lead vehicle of vehicle system 2.

In some embodiments or examples, the vehicle system 2 can include a first communication unit 8 disposed in one location and a second communication unit disposed in another location. The first communication unit can be disposed onboard the lead vehicle and the second communication unit can be disposed onboard the last vehicle. In one embodiment, the first communication unit is an HOT unit and the second communication unit is an EOT unit 12. These communication units can be used to control the brakes and/or throttles of the vehicle system.

Each of the communication units can include one or more than one processor 18 and a memory 20 coupled to the processor(s) 18 and operative for storing one or more software control programs and/or operational data. The first communication unit can include a wireless transceiver (or radio) 26 and the second communication unit 12 can include a wireless transceiver (or radio) 28. The second communication unit may include a location determining device 24 (e.g., a global navigation satellite system (GNSS) receiver, such as a global positioning system (GPS) receiver) and the first communication unit may also include an optional location determining device 22 (e.g., a GNSS receiver such as a GPS receiver).

The processor(s) 18 and memory 20 of the first communication unit 8 can comprise or form a controller 30 while the processor(s) 18 and memory 20 of the second communication unit can comprise or form a controller 32.

Figure 2:
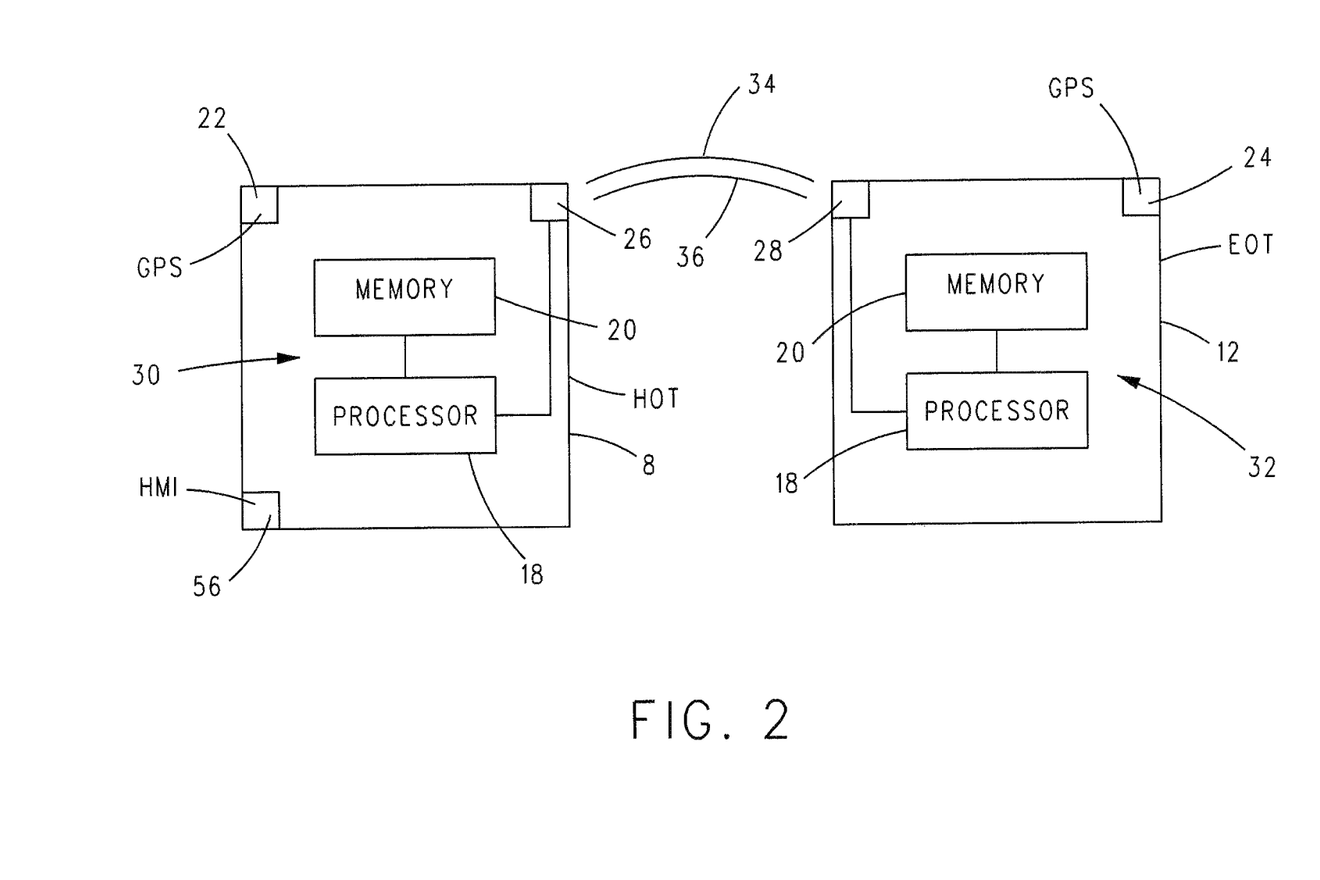
FIG. 2 is a diagrammatic illustration of the HOT, EOT, and multiple communication channels or links of FIG. 1.

Wireless transceivers 26 and 28 can each be programmed or configured to provide a plurality of wireless communication channels therebetween. Each of the wireless communication channels can operate at a different radio carrier frequency than each other wireless communication channel. The plurality of wireless communication channels can include a first wireless communication channel 34 between wireless transceivers 26 and 28 and a second wireless communication channel 36 between wireless transceivers 26 and 28. The first and second wireless communication channels 34 and 36 can be operated in parallel, where common information or data can be transmitted in parallel over first and second wireless communication channels 34 and 36. The common information also can be referred to as the same information. The common or same information or data can mean that the exact same data is communicated via each of the channels in one example. In another example, the same information or data can mean that only part, but not all, of the information or data sent via one channel is the same (and identical to) at least some of the information sent via the other channel. For example, the same information may be sent on both channels but with one channel including different CRC or checksum data than the other channel.

Each wireless transceiver 26 and 28 can be programmed or configured to be in a sleep state while not conveying information or data via the first and second wireless communication channels 34 and 36. When it is desired to transmit information or data in parallel via the first and second wireless communication channels 34 and 36, the processor(s) 18 can initiate the transmission can cause the corresponding wireless transceiver (26 or 28) to awake from the sleep state and begin transmitting the information or data via both wireless communication channels 34 and 36 in parallel to the other wireless transceiver (28 or 26). The other wireless transceiver (28 or 26) in the sleep state can be programmed or configured to be responsive to information or data transmitted on first and/or second wireless communication channels 34 and/or 36 to awake from the sleep state to receive the information or data transmitted in parallel on the first and second wireless communication channels 34 and 36, to demodulate the information or data transmitted thereon, and to provide the same to the processor(s) associated with the other wireless transceiver (28 or 26). For example, starting from the state where first and second radio transceivers 26 and 28 are each in a sleep state, in response to the processor(s) 18 of the first communication unit 8 communicating information or data to wireless transceiver 26, the wireless transceiver 26 awakes from the sleep state and begins transmitting the information or data over first and second wireless communication channels 34 and 36 in parallel. In response to sensing information or data being transmitted at the first and second carrier frequencies 42 and 44 (FIG. 3) associated with first and second wireless communication channels 34 and 36, the wireless transceiver 28 can awake from the sleep state and complete the formation of the first and second wireless communication channels 34 and 36. Thereafter, the wireless transceiver 28 can receive the information or data transmitted on first and second wireless communication channels 34 and 36, demodulate the information or data, and forward said demodulated information or data to the processor(s) 18 of the second communication unit for processing in accordance with programming of the second communication unit. This processing can involve controlling or changing movement of the vehicle system based on the information or data that is communicated. For example, the processing can involve changing a throttle setting or brake setting, or otherwise changing the moving speed of the vehicle system, based on the information or data that is received.

Figure 3:
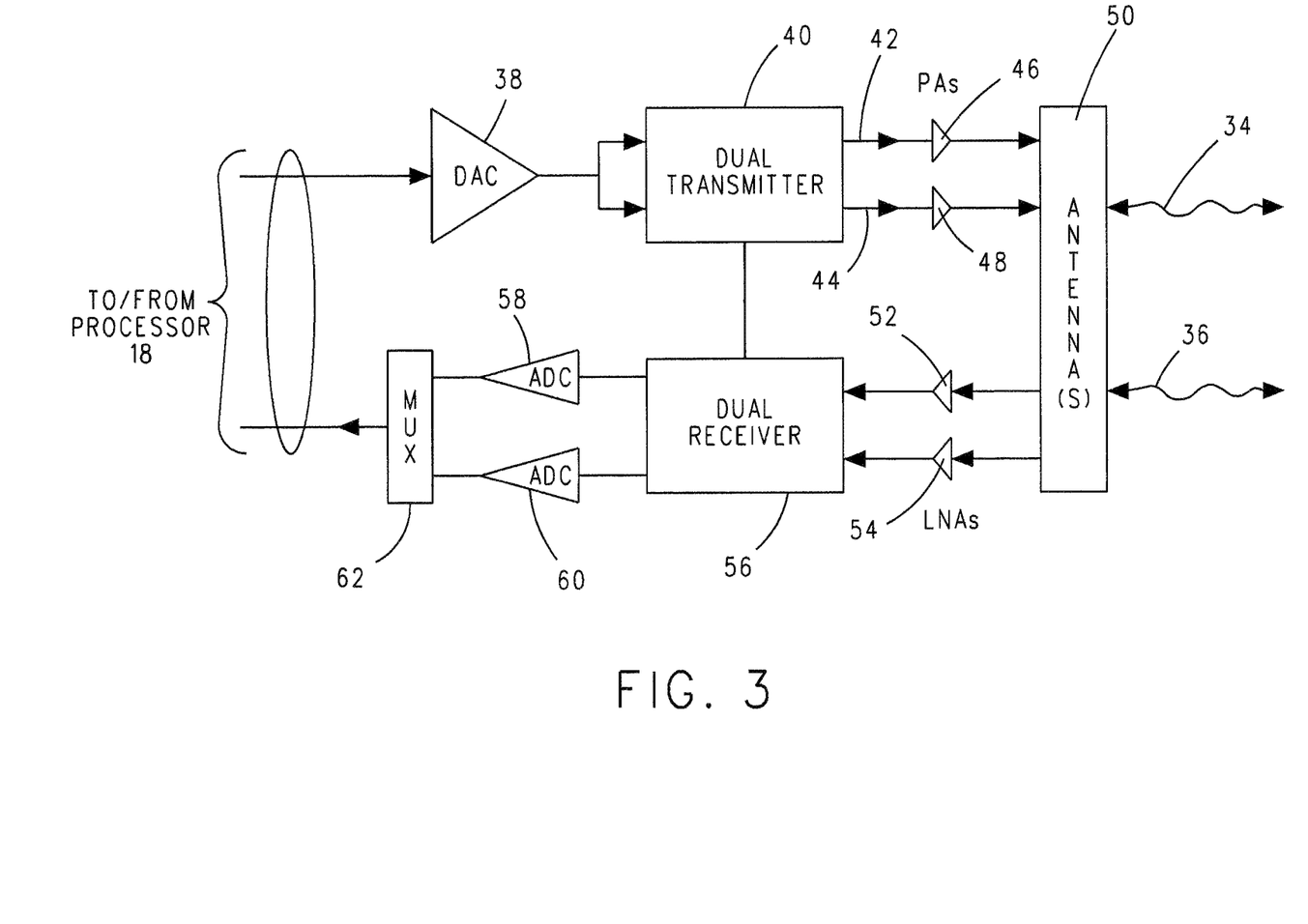
FIG. 3 is a diagrammatic illustration of one embodiment or example of a wireless transceiver that can be utilized with each of the HOT and EOT shown in FIG. 1.

With reference to FIG. 3 and with continuing reference to FIGS. 1 and 2, each wireless transceiver 26 and 28 can include a digital-to-analog converter (DAC) which can convert digital data from the corresponding processor(s) 18 into analog data which can be supplied to a dual transmitter 40. The dual transmitter 40 can modulate the analog signal received from the DAC 38 onto the first and second radio carrier frequencies 42 and 44, which can be amplified by power amplifiers 46 and 48, respectively, and transmitted via one or more antennas 50.

Each wireless transceiver 26 and 28 also can include low noise amplifiers 52 and 54 for receiving and amplifying signals received via the one or more antennas 50 and for providing the amplified signals to a dual receiver 56. The dual receiver 56 can demodulate the signals received from low noise amplifiers 52 and 54 and provide the demodulated signals to analog-to-digital converters (ADC) 58 and 60. The digitized outputs of the ADCs 58 and 60 can be provided to multiplexer 62 which, in turn, can provide the digitized outputs to the corresponding processor(s) 18 for processing in accordance with programming of the processor(s) 18.

The data communicated in parallel via first and second wireless communication channels 34 and 36 between the first and second communication units can include data integrity information appended thereto. The integrity of the data being transmitted can be confirmed using this data integrity information. Similarly, the information or data received by the first and second communication units can include, in addition to the transmitted information or data, the data integrity information. Information from which the data integrity can be determined can include at least one of the following: a checksum; a BCH code; or a CRC.

In some embodiments or examples, in response to receiving the plural instances of information or data (including the data integrity information) from the ADCs 58, 60 and multiplexer 62, the corresponding processor(s) 18 (upon determining that each instance of the information or data is valid or accurate from the data integrity information), the processor(s) 18 can further process either instance of the information or data in accordance with programing of the processor(s) 18. On the other hand, for example, if one instance of the information or data fails the data integrity check and is invalid, and another instance of the information or data passes the data integrity check and is valid, the processor(s) 18 can use the latter or other instance of the information or data (that is valid) in accordance with the programming of the processor(s) 18.

The foregoing description of the elements comprising each wireless transceiver 26 and 28 is for the purpose of illustration and is not to be construed as limiting in every embodiment since it is envisioned that one or both of wireless transceivers 26 and/or 28 may be comprised of any other suitable and/or desirable elements that enable the transmission and receipt of information or data over first and second wireless communication channels 34 and 36.

Having described an example wireless transceiver for producing first and second wireless communication channels 34 and 36 in parallel, various methods of communication from or between the communication units 8, 12, or vice versa, will now be described.

Figure 4:
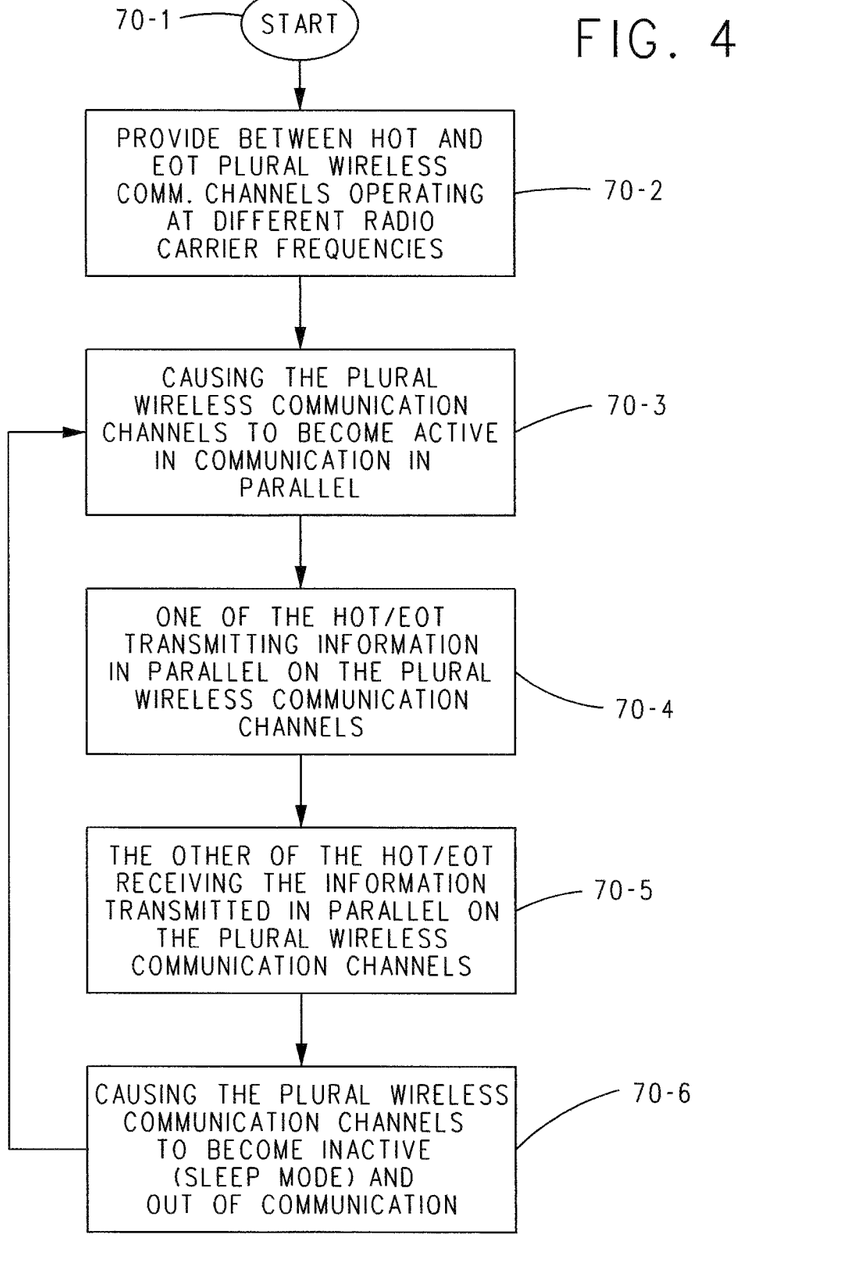
FIG. 4 is a flow diagram of a method.

With reference to FIG. 4 and with continuing reference to all previous figures, one method of communication between the communication units 8, 12 in accordance with the principles of the inventive subject matter will now be described.

In some embodiments or examples, the method advances from a step 70-1 to step 70-2 where plural wireless communication channels (e.g., 34 and 36) operating at different radio carrier frequencies are provided between the communication units. In an example, step 70-2 can include, among other things, providing the necessary hardware (e.g., wireless transceivers 26 and 28) to enable the plural wireless communication channels (e.g., 34 and 36) to be established between the communication units 8, 12. In some embodiments or examples, it is not necessary for the one or more of the plural wireless communication channels to be active in step 70-2.

At step 70-3, the plural wireless communication channels are caused (e.g., via the controllers of the communication units 8, 12) to become active in communication in parallel. In step 70-4, one of the communication unit 8 or the communication unit 12 communicates (e.g., transmits) some or all of the same information in parallel on the plural wireless communication channels. In step 70-5, the other of the communication unit 8 or the communication unit 12 receives the information transmitted in parallel on the plural wireless communication channels in step 70-4.

In step 70-6, the plural wireless communication channels can then be caused to be inactive (e.g., placed into a sleep mode) and out of communication. In some non-limiting embodiments or examples, the plural wireless communication channels can be inactive in response the wireless transceivers 26 and 28 entering a sleep mode. For example, the wireless transceiver 26 and/or 28 may turn off after a predetermined interval of time during which no information or data is being passed between the wireless transceivers 26, 28. This timing of entering sleep mode can be controlled by hardware of each wireless transceiver 26 and 28 and/or the processor(s) 18 coupled to each wireless transceiver.

Thereafter, steps 70-3 through 70-6 may be repeated (e.g., intermittently) as needed when communication from the communication unit 8 to the communication unit 12, or from the communication unit 12 to the communication unit 8, is desired. The information or data transmitted in parallel on the plural wireless communication channels can comprise digital data that is modulated on each radio carrier frequency.

In an example, each communication channel can be operated at a radio carrier frequency of approximately 160 MHz, 220 MHz, 450 MHz, or between 450 MHz and 500 MHz. In an example, the first wireless communication channel 34 may operate at 160 MHz while second wireless communication channel 36 may operate at 220 MHz. Alternatively, both or at least one of the communication channels 34, 36 can operate at 450 MHz. In another example, each wireless communication channel 34 and 36 operates at a different carrier frequency.

In some embodiments or examples, at least one wireless communication channel 34 or 36 may comprise a cellular telephone infrastructure whereupon information or data communicated on the wireless communication channel is routed through said cellular telephone infrastructure. In this example, instead of there being a direct communication between wireless transceivers 26 and 28, at least one wireless communication channel 34 or 36 can include information or data being transmitted via the cellular telephone infrastructure (network). In an example, cellular telephone frequencies can vary between 700 MHz and 2.7 GHz, depending on the country or region where the vehicle system may be operating.

The choice of frequencies and, optionally, infrastructure used with each wireless communication channel 34 and 36 can be selected in any suitable and/or desirable manner to accomplish the aim of communicating information or data in parallel on first and second wireless communication channels 34 and 36. Accordingly, the particular description of frequencies and/or infrastructure (e.g., a cellular telephone infrastructure) that may be used is not to be construed in a limiting sense in all embodiments.

Figure 5:
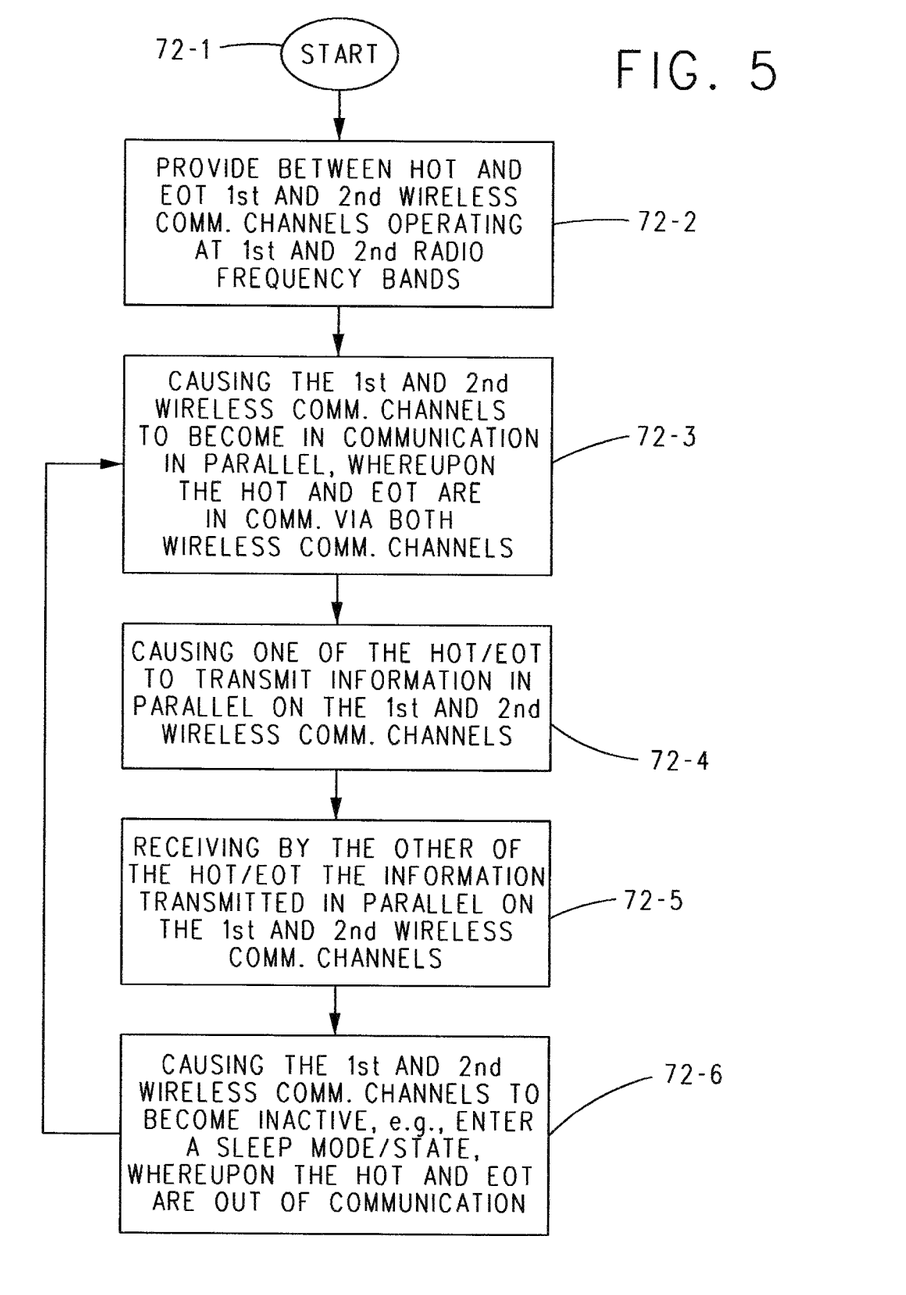
FIG. 5 is a flow diagram of another method.

With reference to FIG. 5, another method of communication between the communication units 8, 12 can include step 72-1 to step 72-2. In step 72-2, first and second wireless communication channels 34 and 36 operating at first and second radio frequency bands are provided between the communication unit 8 and the communication unit 12. As discussed above, it is envisioned that this step can comprise providing the necessary hardware and/or software need to establish the first and second wireless communication channels 34 and 36.

At step 72-3, the first and second wireless communication channels 34 and 36 are caused to be in communication in parallel, whereupon the communication unit 8 and the communication unit 12 are in communication in parallel via both the first and second wireless communication channels 34 and 36.

At step 72-4, one of the communication unit 8 or the communication unit 12 causes information or data to be transmitted in parallel on the first and second wireless communication channels 34 and 36.

At step 72-5, the other of the communication unit 8 or the communication unit 12 receives the information or data transmitted in parallel on the first and second wireless communication channels 34 and 36. At step 72-6, the first and second wireless communication channels are caused to be inactive (e.g., enter into a sleep mode or state), where the communication unit 8 and the communication unit 12 are out of communication with each other. For example, the communication units 8, 12 may not be able to communicate with each other when at least one of the communication units 8, 12 is inactive.

Steps 72-3 through 72-6 can be repeated (e.g., intermittently) as deemed suitable and/or desirable to transmit information or data from the communication unit 8 to the communication unit 12, or vice versa.

One or more instances of step 72-3 optionally can include one of the wireless transceivers 26 or 28 awakening from the low power, stand-by, or sleep mode into the active, fully operational mode and initiating communication with the other wireless transceiver 28 or 26 via a carrier frequency associated with at least one of the first and/or second wireless communication channels 34 and 36. In response, the other wireless transceiver can awake from the low power, stand-by, or sleep mode to the active, fully operational mode, whereupon the wireless transceivers 26 and 28 can form the first and second wireless communication channels 34 and 36.

When it is desired to communicate data between the communication unit 12 and the communication unit 8, the processor(s) 18 of the communication unit 12 optionally causes the wireless transceiver 28 to awaken from the low power, stand-by, or sleep mode (where communication with the communication unit 12 does not occur or is not possible) into a fully operational mode to initiate communication with the wireless transceiver 26 (which can be in the low power, stand-by, or sleep mode or alternatively may be active). In an example, while the wireless transceiver 26 is in the low power, stand-by or sleep mode, the wireless transceiver 26 can be programmed or configured to respond to communications from the wireless transceiver 28 and awaken from the low power, stand-by, or sleep mode (where communication does not or cannot occur) into the active, fully operational mode (where communication can occur). Once the wireless transceivers 26 and 28 have awakened from the low power, stand-by, or sleep modes into the active, fully operational modes, the first and second wireless communication channels 34 and 36 can be formed in parallel between the wireless transceivers 26 and 28.

As discussed above, each transmission of information or data in parallel on first and second wireless communication channels 34 and 36 optionally can include data integrity information. In an example, this data integrity information can include a checksum of the information or data that is transmitted. In response to receiving each instance of information transmitted in parallel on the first and second wireless communication channels 34 and 36, a first checksum of the information or data transmitted on wireless communication channel 34 and a second checksum of information or data transmitted on wireless communication channel 36 can be calculated by the processor(s) 18 associated with the receiving wireless transceiver. The calculated checksum(s) can be compared to a reference checksum comprising the data integrity information included with the transmitted information or data (to determine whether communication of the information was successful).

The first checksum can be compared to the reference checksum to determine whether the information or data transmitted on first wireless communication channel 34 is valid. Similarly, the second checksum can be compared to the reference checksum to determine whether the information or data transmitted on second wireless communication channel 36 is valid. In an example, provided the information or data transmitted via least one wireless communication channel 34 and 36 is valid, the information or data can be utilized by the corresponding processor(s) 18 in accordance with programming of the processor(s) 18. Moreover, the processor(s) 18 associated with the wireless transceiver receiving the information or data can utilize the calculated first and second checksums as a confirmation of the integrity of the information or data. In an example, if the calculated first and second checksums are the same and each calculated checksum is the same as the reference checksum included with the transmitted information or data, the processor(s) 18 associated with the wireless transceiver receiving the information or data is assured of the integrity of the data, whereupon the processor(s) can store or respond to the information or data in accordance with programming of the processor(s).

If the processor(s) 18 associated with the wireless transceiver receiving the information or data transmitted in parallel on the first and second wireless communication channels 34 and 36 determines that, for example, the first checksum is not equal to the reference checksum and the second checksum is equal to the reference checksum, the processor(s) 18 optionally can store or respond to the information transmitted only on the second wireless communication channel, and optionally ignore the information or data transmitted on the first wireless communication channel.

Each response to information or data transmitted on a wireless channel can include the processor(s) 18 associated with the wireless transceiver (e.g., 26 or 28) receiving the transmitted information or data transmitting second information or data in parallel on the first and second wireless communication channels 34 and 36. The second information transmitted in parallel on the first and second wireless communication channels 34 and 36 can be received by the other wireless transceiver (e.g., 28 or 26).

In an example, the second communication unit 12 can transmit information or data on first and second wireless communication channels 34 and 36 to the first communication unit 8. In response, the processor(s) 18 of the first communication unit 8 may transmit second information or data in parallel on the first and second wireless communication channels 34 and 36 to the second communication unit 12. In this example, the second information or data may include an acknowledgement by the first communication unit 8 that the information or data transmitted by the second communication unit 12 was received. In some embodiments or examples, the information or data transmitted in parallel on first and second wireless communication channels 34 and 36 can be digital data that is modulated on the respective first and second carrier frequencies or frequency bands of the first and second communication channels 34 and 36.

Each frequency band can include at least one of the following frequencies: a frequency of 450 MHz, a frequency between 450 MHz and 500 MHz; a frequency of 220 MHz; a frequency of 160 MHz; or a cellular telephone frequency between 700 MHz and 2.7 GHz, in various embodiments or examples. In an example, each frequency may be a center frequency of a corresponding frequency band.

Figure 6:
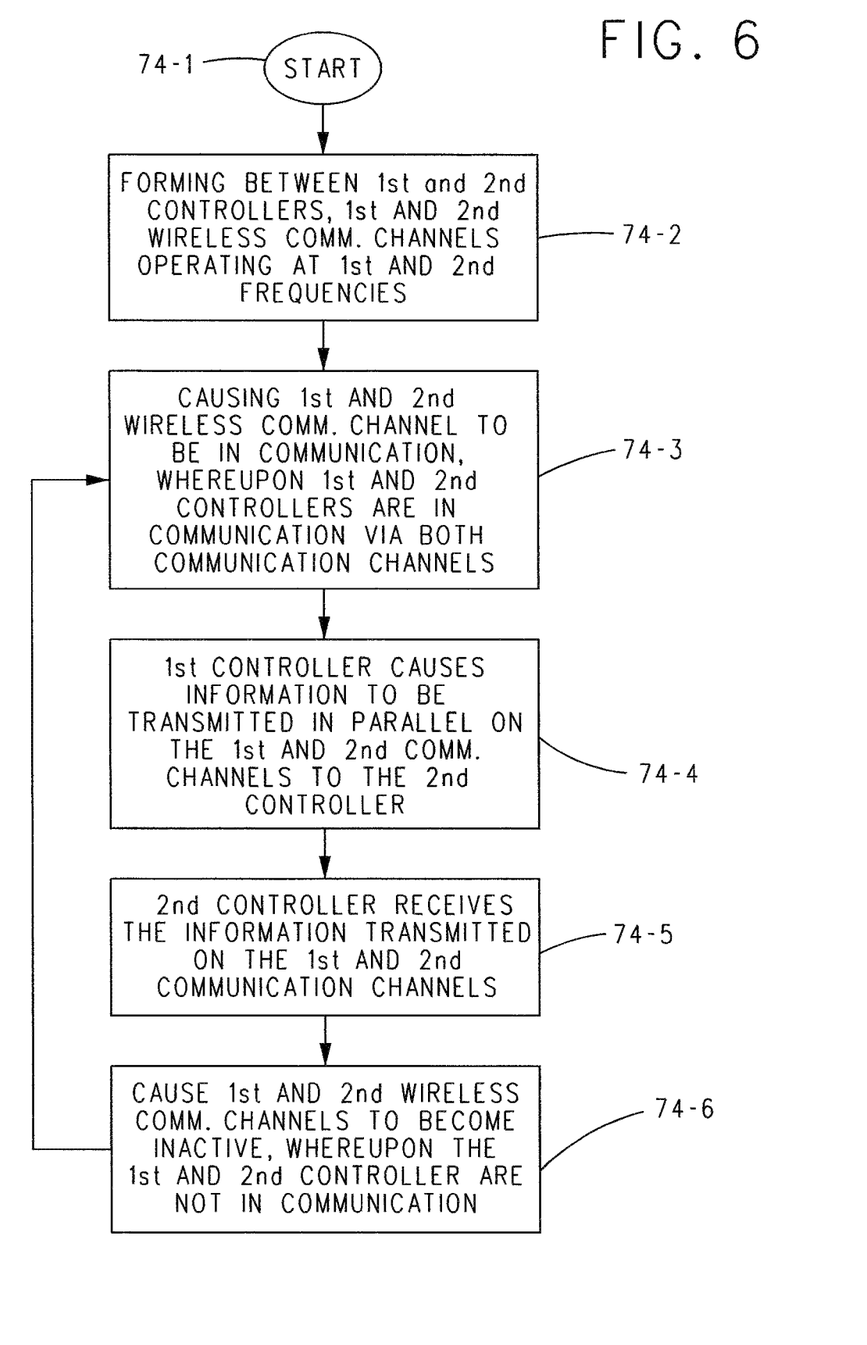
FIG. 6 is a flow diagram of another method.

With reference to FIG. 6 and with continuing reference to all previous figures, in some embodiments or examples, in another method of communicating between first and second controllers 30 and 32 positioned in spaced relation along the length of the vehicle system, where each controller includes one or more processors 18, includes advancing from step 74-1 toward step 74-2. In step 74-2, first and second wireless communication channels operating at first and second frequencies can be formed between first and second controllers 30 and 32. Step 74-2 optionally can include, among other things, wireless transceivers 26 and 28 being able to communicate with each other via first and second wireless communication channels 34 and 36.

The method can then advance toward step 74-3, where the first and second wireless communication channels 34 and 36 are caused to be in communication with each other in parallel. This causes the first and second controllers 30 and 32 to be in communication via both the first and second wireless communication channels 34 and 36. In step 74-4, the first controller can cause information or data to be transmitted in parallel on the first and second wireless communication channels 34 and 36 to the second controller.

The method optionally can then advance to step 74-5, where the second controller can receive the information transmitted in parallel on the first and second wireless communication channels 34 and 36 in step 74-4. Finally, the method can then advance toward step 74-6, where the first and second wireless communication channels can be caused to be inactive (e.g., set to a sleep mode), where the first and second controllers are not in communication. Thereafter, the method can repeat steps 74-3 through 74-6 as needed (e.g., intermittently).

Step 74-3 optionally can include one of the wireless transceivers 26 or 28 awakening from a low power, stand-by, or sleep mode into the active, fully operational mode, and initiating communication with the other wireless transceiver via at least one of the first and second wireless communication channels 34 and 36. In response to this communication, the other wireless transceiver can awaken from the low power, stand-by, or sleep mode into the active, fully operational mode, whereupon the wireless transceivers 26 and 28 can form first and second wireless communication channels 34 and 36 in parallel.

The first controller can be controller 30 or 32 while the second controller can be the other of controller of 30 or 32.

As can be seen, disclosed herein are methods of communicating between first and second controllers which can comprise the first communication unit 8 and the second communication unit 12. The various methods described herein utilize first and second communication channels formed in parallel between the first and second controllers in parallel for communicating the same data between said first and second controllers. By providing first and second communication channels between the first and second controllers, a drawback associated with utilizing only a single channel for communication, namely, the communication channel becoming disrupted whereupon there is no communication between the first and second controllers for, possibility, an extended period of time due to, for example, challenging environmental conditions.

In the present invention, the use of multiple communication channels simultaneously improves the likelihood that the first and second controllers will be able to communicate information when needed especially for the safe operation of a train.

For example, for trains equipped with a pressurized brake pipe, it can be desirable to release the pressure in the brake pipe (thereby activating the brakes) from both ends of the train. This typically is accomplished by the communication unit 8 transmitting a command to vent the brake pipe to atmosphere to the second communication unit 12, thereby causing the brakes to be applied. The use of two or more communication channels in accordance one or more embodiments of the principles of the present invention versus a single communication channel in accordance with the teachings of the prior art, improves the likelihood that the first communication unit 8 will be able to communicate a brake command to the second communication unit 12, especially when emergency braking is needed. Optionally, a communication unit can operate in a parallel mode during one time period and in a non-parallel mode during another (preceding or subsequent) time period. For example, the first communication unit can communicate common information to the second communication unit on different wireless channels (e.g., different center frequencies) at the same time (or during overlapping time periods). At an earlier or later time, the first communication unit can communicate information (same or different information than the common information) to the second communication unit on one of the same wireless channels (or a different wireless channel), but not on multiple channels. The communication unit(s) can determine whether to send information in parallel on multiple channels or via only a single channel depending on the type of information that is communicated. In one embodiment, information related to safe operation of the vehicle system is communicated in parallel, while information related to auxiliary operations of the vehicle system is communicated via only a single channel. For example, location information, instructions to change a throttle setting, instructions to change a brake setting (e.g., a direction to apply brakes), pressure readings of an air brake system, etc., can be communicated in parallel on multiple channels while other sensor information (e.g., temperature measurements, speed measurements, voltage or current measurements, etc.) may be communicated via only a single channel.

In an embodiment, a method includes activating plural wireless communication channels in parallel, between a first wireless transceiver and a second wireless transceiver onboard different vehicles (e.g., of a train, road vehicle convoy or platoon, or other multi-vehicle system). Each of the plural wireless communication channels operates at a different radio carrier frequency. The method further includes concurrently transmitting, by the first wireless transceiver, common information (e.g., at least some of the same information) in parallel on the plural wireless communication channels to the second wireless transceiver. The method further includes, after transmitting the common information, deactivating the plural wireless communication channels. The method may further include subsequently activating only one, but not multiple, of the wireless communication channels (i.e., one and one only), and transmitting, by the first wireless transceiver to the second wireless transceiver, second, at least partially different information on the one wireless communication channel that is activated.

Although the inventive subject matter has been described in detail for the purpose of illustration based on what is currently considered to be the most practical preferred and non-limiting embodiments, examples, or aspects, it is to be understood that such detail is solely for that purpose and that the invention is not limited to the disclosed preferred and non-limiting embodiments, examples, or aspects, but, on the contrary, is intended to cover modifications and equivalent arrangements that are within the spirit and scope of the appended claims. For example, it is to be understood that the present invention contemplates that, to the extent possible, one or more features of any preferred and non-limiting embodiment, example, or aspect can be combined with one or more features of any other preferred and non-limiting embodiment, example, or aspect.

What is claimed is:

1. A system, comprising:
   a head of train (HOT) transceiver configured to be disposed onboard a first rail vehicle in a rail vehicle system; and
   an end of train (EOT) transceiver configured to be disposed onboard a second rail vehicle in the rail vehicle system, the HOT transceiver and the EOT transceiver configured to activate plural wireless communication channels at different carrier frequencies in parallel between the HOT transceiver and the EOT transceiver, the HOT transceiver and the EOT transceiver configured to communicate common information in parallel on the plural wireless communication channels between the HOT transceiver and the EOT transceiver.

2. The system of claim 1, wherein the HOT transceiver and the EOT transceiver are configured to deactivate the plural wireless communication channels after communicating the common information in parallel via the plural wireless communication channels.

3. The system of claim 1, wherein the HOT transceiver and the EOT transceiver are configured to communicate the common information via the plural wireless communication channels for controlling one or more of a throttle setting or a brake setting of at least one of the first rail vehicle or the second rail vehicle using the common information that is communicated.

4. The system of claim 1, wherein the common information is first information, and the HOT transceiver and the EOT transceiver are configured to activate one but not multiple of the wireless communication channels and communicate second information on the one wireless communication channel that is activated.

5. The system of claim 1, wherein at least one of the HOT transceiver or the EOT transceiver is configured to switch from a low power, stand-by, or sleep mode to an active or fully operational mode for communicating the common information.

6. The system of claim 1, wherein the HOT transceiver and the EOT transceiver are configured to activate the plural wireless communication channels at the carrier frequencies that are 450 megahertz (MHz), between 450 MHz and 500 MHz, 160 MHz, or between 700MHz and 2.7 gigahertz (GHz).

7. The system of claim 1, wherein at least one of the HOT transceiver or the EOT transceiver is configured to determine data integrity of the common information received via the plural wireless communication channels and subsequently deactivate the plural wireless communication channels.

8. The system of claim 1, wherein the HOT transceiver and the EOT transceiver are configured to communicate the common information via the plural wireless communication channels and different information via the plural wireless communication channels.

9. The system of claim 8, wherein the HOT transceiver and the EOT transceiver are configured to communicate the different information as one or more of cyclic redundancy check data or checksum data.

10. The system of claim 1, wherein the HOT transceiver and the EOT transceiver are configured to communicate information related to movement of the rail vehicle system as the common information and to communicate auxiliary information via fewer than all the plural wireless communication channels.

11. The system of claim 10, wherein the HOT transceiver and the EOT transceiver are configured to communicate one or more of location data, throttle setting change data, brake setting change data, or brake pressure data as the information related to the movement of the rail vehicle system.

12. The system of claim 11, wherein the HOT transceiver and the EOT transceiver are configured to communicate one or more of temperature measurements, speed measurements, voltage measurements, or current measurements as the auxiliary information.

13. A method, comprising:
activating a head of train (HOT) transceiver onboard a first rail vehicle in a rail vehicle system;
activating an end of train (EOT) transceiver disposed onboard a second rail vehicle in the rail vehicle system, the HOT transceiver and the EOT transceiver activated to form plural wireless communication channels at different carrier frequencies in parallel between the HOT transceiver and the EOT transceiver; and
communicating common information in parallel on the plural wireless communication channels between the HOT transceiver and the EOT transceiver.

14. The method of claim 13, further comprising:
deactivating the plural wireless communication channels after communicating the common information in parallel via the plural wireless communication channels.

15. The method of claim 13, further comprising:
controlling one or more of a throttle setting or a brake setting of at least one of the first rail vehicle or the second rail vehicle using the common information that is communicated.

16. The method of claim 13, wherein the common information is first information, and further comprising:
activating one but not multiple of the wireless communication channels between the HOT transceiver and the EOT transceiver; and
communicating second information on the one wireless communication channel that is activated between the HOT transceiver and the EOT transceiver.

17. The method of claim 13, further comprising:
switching at least one of the HOT transceiver or the EOT transceiver from a low power, stand-by, or sleep mode to an active or fully operational mode for communicating the common information.

18. The method of claim 13, wherein the plural wireless communication channels are activated at the carrier frequencies that are 450 megahertz (MHz), between 450 MHz and 500MHz, 160 MHz, or between 700 MHz and 2.7 gigahertz (GHz).

19. A method, comprising:
activating a head of train (HOT) transceiver onboard a first rail vehicle in a rail vehicle system;
activating an end of train (EOT) transceiver disposed onboard a second rail vehicle in the rail vehicle system, the HOT transceiver and the EOT transceiver activated to form plural wireless communication channels at different carrier frequencies in parallel between the HOT transceiver and the EOT transceiver;
communicating common information in parallel on the plural wireless communication channels between the HOT transceiver and the EOT transceiver; and
communicating different information via at least one of the plural wireless communication channels between the HOT transceiver and the EOT transceiver.

20. The method of claim 19, wherein information related to movement of the rail vehicle system is communicated as the common information and auxiliary information is communicated as the different information.

* * * * *